United States Patent
Thouppuarachchi et al.

(10) Patent No.: US 12,475,188 B2
(45) Date of Patent: Nov. 18, 2025

(54) COMPUTE TIME POINT PROCESSOR ARRAY FOR SOLVING PARTIAL DIFFERENTIAL EQUATIONS

(71) Applicant: Vorticity Inc., Redwood City, CA (US)

(72) Inventors: Chirath Neranjena Thouppuarachchi, Redwood City, CA (US); Ross Geoffrey Daly, San Francisco, CA (US)

(73) Assignee: Vorticity Inc., Redwood City, CA (US)

(*) Notice: Subject to any disclaimer, the term of this patent is extended or adjusted under 35 U.S.C. 154(b) by 895 days.

(21) Appl. No.: 17/576,795

(22) Filed: Jan. 14, 2022

(65) Prior Publication Data

US 2022/0229880 A1 Jul. 21, 2022

Related U.S. Application Data

(60) Provisional application No. 63/137,921, filed on Jan. 15, 2021.

(51) Int. Cl.
| | |
|---|---|
| *G06F 17/13* | (2006.01) |
| *G06F 9/30* | (2018.01) |
| *G06F 9/38* | (2018.01) |
| *G06F 7/57* | (2006.01) |

(52) U.S. Cl.
CPC .......... *G06F 17/13* (2013.01); *G06F 9/3001* (2013.01); *G06F 9/3851* (2013.01); *G06F 7/57* (2013.01)

(58) Field of Classification Search
CPC ...................................................... G06F 17/13
See application file for complete search history.

(56) References Cited

U.S. PATENT DOCUMENTS

| | | | | |
|---|---|---|---|---|
| 5,740,463 | A * | 4/1998 | Oshima | G06F 17/13 712/12 |
| 8,676,551 | B1 * | 3/2014 | Bozin | G06F 17/13 703/6 |
| 11,163,715 | B1 * | 11/2021 | Luijten | G06F 17/13 |
| 2011/0196907 | A1 * | 8/2011 | Kusmanoff | G06F 17/13 708/446 |
| 2014/0137124 | A1 * | 5/2014 | Szalay | G06F 9/5072 718/102 |
| 2015/0149132 | A1 * | 5/2015 | Huang | G06F 17/13 703/2 |
| 2020/0074295 | A1 * | 3/2020 | O'Donncha | G06F 18/2413 |
| 2022/0164410 | A1 * | 5/2022 | Gudla | G06F 17/13 |

FOREIGN PATENT DOCUMENTS

JP    H0887475 A    4/1996

OTHER PUBLICATIONS

United States Office Action, U.S. Appl. No. 17/576,753, filed Jun. 3, 2025, 13 pages.

\* cited by examiner

*Primary Examiner* — Emily E Larocque
*Assistant Examiner* — Markus Anthony Villanueva
(74) *Attorney, Agent, or Firm* — Fenwick & West LLP

(57) ABSTRACT

Embodiments relate to a system for solving partial differential equations. The system receives a problem to be solved comprising a partial differential equation and a domain. A solver stores a plurality of nodes of the domain corresponding to a first time-step, and processes the nodes over a plurality of time-steps using an array of point processors. Each point processor comprises an ALU and a register file, and is configured to receive data corresponding to a respective node of a domain and generate a value for the node for a next time step, based upon instructions received over time via an instruction stream.

20 Claims, 12 Drawing Sheets

COMPUTE TIME POINT PROCESSOR ARRAY FOR SOLVING PARTIAL DIFFERENTIAL EQUATIONS

CROSS-REFERENCE TO RELATED APPLICATION

This application claims the benefit of U.S. Provisional Application No. 63/137,921, filed on Jan. 15, 2021, which is hereby incorporated by reference in its entirety.

BACKGROUND

The present disclosure generally relates to dedicated hardware systems for solving partial differential equations.

Partial differential equations are ubiquitous in describing fundamental laws of nature, human interactions and many other phenomena. Applications include fluid dynamics, molecular dynamics, electronic structure, high frequency options trading, brain tissue simulations, satellite orbitals, nuclear explosion simulations, black hole simulations, etc.

Solving partial differential equations has been a major use of computers since their advent in the mid-1900s. Today, estimates show that over 50% of high performance computing is diverted towards solving partial differential equations, from supercomputers at national labs to small computer clusters in medium size companies. As such, a need exists for computers that can more efficiently solve partial differential equations.

Figure 1:
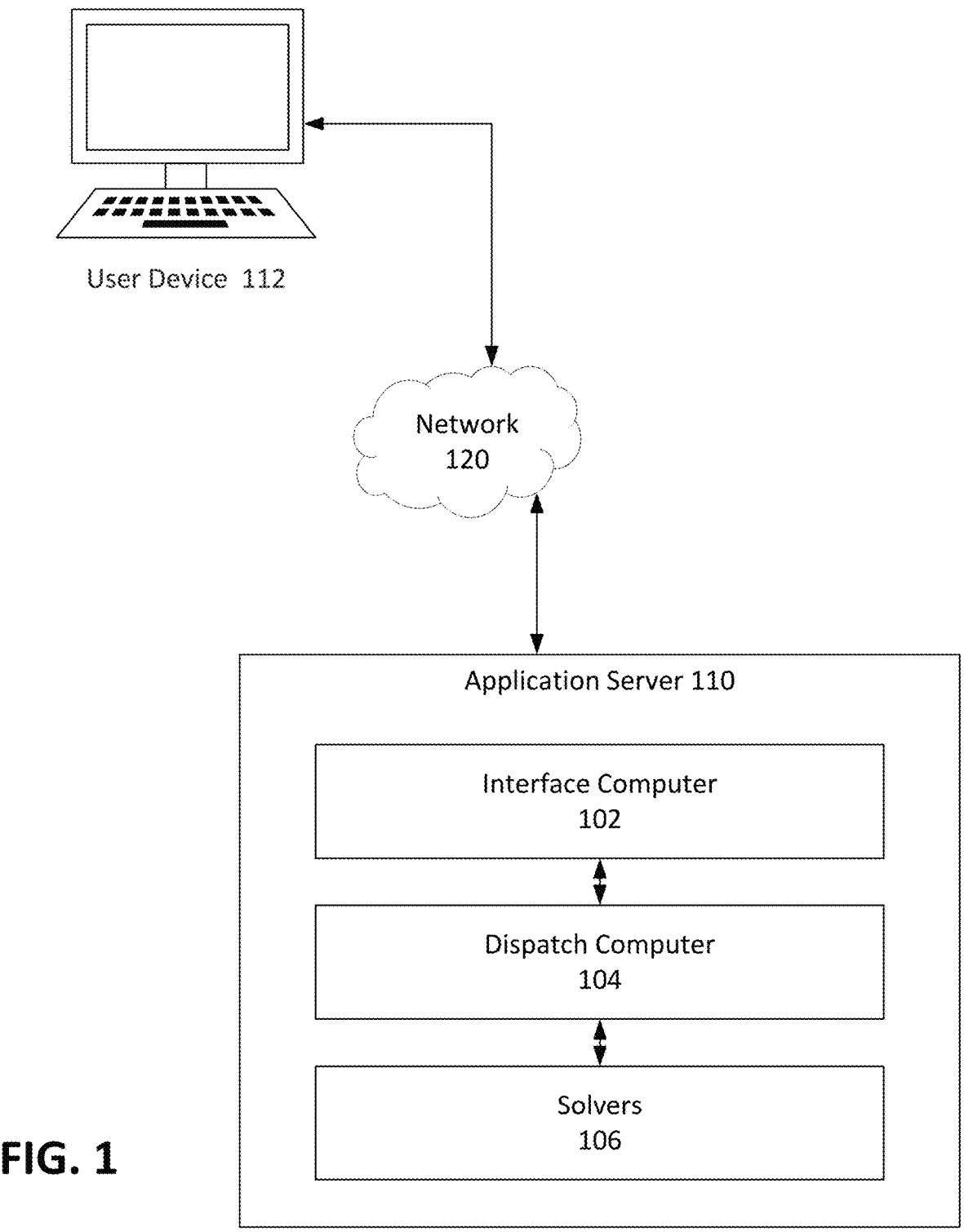
FIG. 1 illustrates a high level diagram of a system for solving partial differential equations, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments herein are directed to a purpose built computing architecture to enable fast solving of partial differential equations within large domains with complicated boundary conditions. Partial differential equations are ubiquitous in describing fundamental laws of nature, human interactions, and many other phenomena. Applications of partial differential equations include fluid dynamics, molecular dynamics, electronic structure, high frequency options trading, brain tissue simulations, satellite orbitals, nuclear explosion simulations, black hole simulations, etc.

While simple partial differential equations can be solved with analytical solutions, many more complicated partial differential equations must be solved numerically in order to obtain useful results. This usually involves breaking up a problem domain into many slices/nodes/particles etc., and solving a discretized form of the equation on each slice/node/particle. This can be a tedious process. In addition, as domain size and accuracy requirements increase (e.g., resolution of the solution, maximum partition size possible, etc.), the number of calculations needed to be performed can increase dramatically.

The usage of current computer systems (e.g., general-purpose computers) has several problems. In many applications, each particle or node in the domain of the partial differential equation to be solved requires perhaps $\sim 10^2$-$10^3$ floating point operations to calculate the next time step. Since these operations have to be done sequentially, the best time scaling that the simulation or solution can achieve is described in Equation (1) below, even without accounting for the clock cycles needed in a von Neumann architecture to fetch instructions, decode, access memory multiple times to perform a single operation.

$$\frac{\text{computer clock speed } [s-1]}{\text{operations per node } [timesstep-1] \times \text{number of nodes in domain}} timesteps/\text{second} \quad (1)$$

For problems that require "strong vertical scaling" such as molecular dynamics, this ceiling is a major problem where even the best supercomputers can only muster several microseconds of simulation time for several days' worth of compute time.

When possible, for large domain sizes, parallel computing can be used to speed up the solution. However the need to pass large amounts of data between the parallel computing units in such a setup slows down the time to solution. For example, when engineers use 1000 cores, the speed up is no more than 10 times as fast as using a single core. This problem is generally referred to as Amdahl's law, where the speed up in latency of the execution of tasks from using additional parallel processors levels off even as additional parallel processors are added, due to the speedup being limited by the serial portion of the program.

In some applications, a problem may consist of both a small time scale and a very large domain size. An example of this is direct numerical simulations of the Navier Stokes equation. Typically, these types of problems are never solved except on rare occasions on national super computers despite the unprecedented accuracy.

In addition, in cases where the solution at a particular time interval needs to be recorded, then in most cases the computation will stop to download this timestep information, further adding to the time to solution for a given problem.

System Overview

Embodiments are directed to a computer architecture specialized to solve partial differential equations that addresses the problems expounded above. In some embodiments, a system for solving partial differential equations is configured to receive problem packages corresponding to problems to be solved, each comprising at least a partial differential equation and a domain. A solver stores a plurality of nodes of the domain corresponding to a first time-step, and processes the nodes over a plurality of time-steps using an array of point processors. Each point processor comprises a computational element (e.g., an ALU) and a storage element (e.g., a register file), and is configured to receive data corresponding to a respective node of a domain and generate a value for the node for a next time step, based upon instructions received over time via an instruction stream. In some embodiments, the array of point processors is divided into slices which receive data and instructions in a staggered manner. Because all the data and computational requirements of the point processors are determined at compile time, the point processors do not need to perform any dynamic scheduling, allowing for a greater proportion of on-chip area to be allocated towards useful computation.

FIG. 1 illustrates a high level diagram of a system for solving partial differential equations, in accordance with some embodiments. The system comprises an interface computer 102, a dispatch computer 104, and a plurality of solver units 106. In some embodiments, the interface computer 102, dispatch computer 104, and solver units 106 are implemented on an application server 110. While FIG. 1 illustrates a single application server 110, it is understood that in other embodiments, the interface computer 102, dispatch computer 104, and solvers 106 may be implemented on multiple servers or devices, on a cloud server, etc.

In some embodiments, the user accesses the application server 110 from a user device 112, such as a PC, laptop, workstation, mobile device, etc. The user device 112 may access the application server 110 through a network 120 (e.g., the Internet). In other embodiments, the user device 112 may connect to the application server 110 via a direct line connection (e.g., a direct line connection to the interface computer 102). In addition, although FIG. 1 only shows a single user device 112 connecting to the application server 110, it is understood that in some embodiments, many user devices may concurrently connect to the application server 110 (e.g., via the network 220).

The user at the user device 112 may transmit to the application server 110 (e.g., through the network 120) one or more problems involving partial differential equations to be solved. In some embodiments, the user device 112 transmits each problem in the form of a problem package, comprising at least a partial differential equation associated with the problem, and a domain. In some embodiments, the problem package further comprises a mesh (or particle domain) for the problem, one or more boundary conditions, initial conditions, flow conditions (such as density and viscosity), a solve type (e.g., 3D incompressible DNS Navier Stokes), and/or the like. The problem package may be sent to the interface computer 102 over the secured internet using a provided API of the interface computer 102.

The interface computer 102 receives the problem package, which is processed by the dispatch computer 104 and dispatched to the solvers 106. The solvers 106 generate a solutions package comprising a solved domain that is transmitted back to the user device 112. The solutions package may further comprise one or more averages, one or more solver metrics, one or more errors messages, etc.

Figure 2:
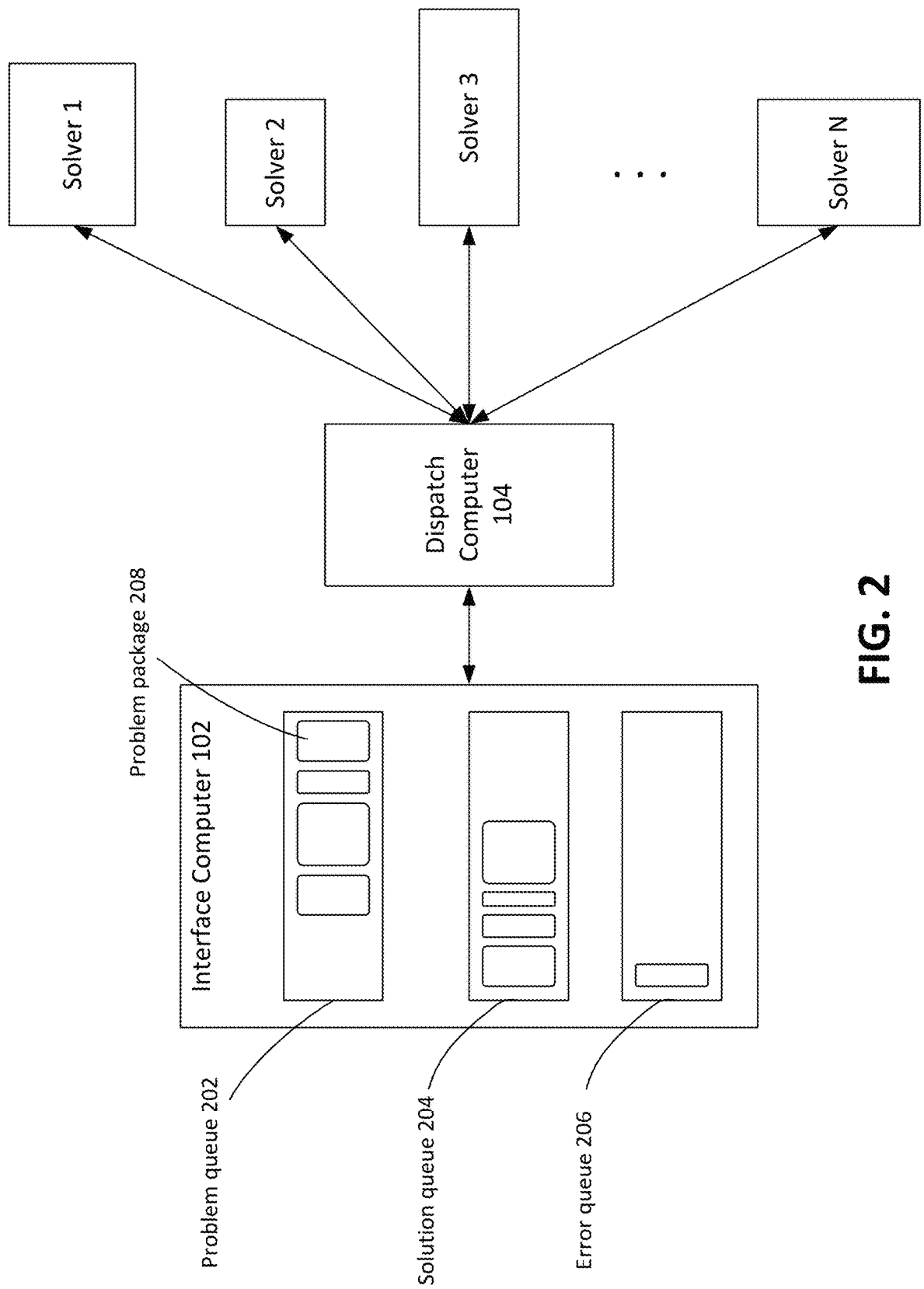
FIG. 2 illustrates a diagram of the interface computer, dispatch computer, and solver units, in accordance with some embodiments.

FIG. 2 illustrates a diagram of the interface computer 102, dispatch computer 104, and solver units 106, in accordance with some embodiments. The interface computer 102 is networked to both the user (e.g., the user device 112) and the dispatch computer 104. The interface computer 102 comprises a problem queue 202, a solution queue 204, and an error queue 206. The interface computer 102 is configured to accept incoming problems to be solved by various interested parties (e.g., problem packages from one or more users at user devices 112), and add the received problem packages 208 to the problem queue 202. In some embodiments, the interface computer 102 may first check the received problem package for accuracy. For example, the interface computer 102 may, if the problem package specifies a time step size and is associated with certain types of partial differential equations, that the specified time step conforms with the Courant-Friedrichs-Lewy (CFL) convergence condition. In cases where the problem package specifies an unstructured mesh, the interface computer 102 may check if the specified mesh is well-formed. In some embodiments, the interface computer 102 may receive a problem package that comprises geometry information with initial and boundary conditions instead of a mesh, whereupon the interface computer may generate a mesh for the problem based upon the received geometry information and conditions.

The interface computer 102 sends problem packages 208 to the dispatch computer 104 to be solved by one or more of the plurality of solvers 106. In some embodiments, each problem package within the problem queue 202 may be assigned a priority level. The priority level for a problem package 202 may be based upon a provided indication within the problem package, the user from which the problem package was received, one or more parameters of the problem package (e.g., type of partial differential equation, size of domain, etc.), size of the problem package, an amount of time the problem package has been in the problem queue 202, and/or any combination thereof.

The interface computer 102 is further configured to receive solution information from the dispatch computer 104. In some embodiments, the solution information is received in the form of one or more solution packages (e.g., as described above). In other embodiments, the interface computer 102 reformats the received solution information to form one or more solution packages. The interface computer 102 stores the one or more solution packages in the solution queue 204, and transmits the solution packages from the solution queue 204 to their respective users (e.g., to the user devices 112 responsible for sending the problem package corresponding to the solution package).

In some embodiments, the interface computer 102 receives error information from the dispatch computer 104, corresponding to any errors encountered by the solvers 106 when solving the problem. In some embodiments, the dispatch computer 102 checks the fidelity of the results of the received solution information, and generates one or more errors if any issues are found (e.g., pressure, density, velocity, etc. parameters not being bounded). The determined errors may be stored in the error queue 206, to be transmitted to corresponding users.

The dispatch computer 104 is networked to the interface computer 102 and to one or multiple solver units 106. The dispatch computer determines which solver 106 is the best to solve a given user problem at a given time. As illustrated in FIG. 2, the dispatch computer 104 may be in communication with a plurality of solvers 106 (e.g., solvers 106-1 through 106-$n$). In some embodiments, the dispatch computer 104 monitors an availability of the solvers 106 (e.g., a capacity of each solver to process additional problems) and the problem queue 202 of the interface computer 102, in order to determine which problem packages 208 should be processed by which of the solvers 106.

The solvers 106 are the workhorses of the system, and are configured to generate solutions to the various problems that come to the system. The solvers may be of different types. For example, each of the solvers 106 may be optimized for one or more specific applications, such as fluid dynamics, molecular dynamics, electronic structure, etc. In some embodiments, each solver 106 may also be optimized to solve domains of different sizes. The various sizes may help optimize the use of the hardware by allocating larger problems to the larger solvers and smaller problems to the smaller solvers.

Solver Structure

Figure 3:
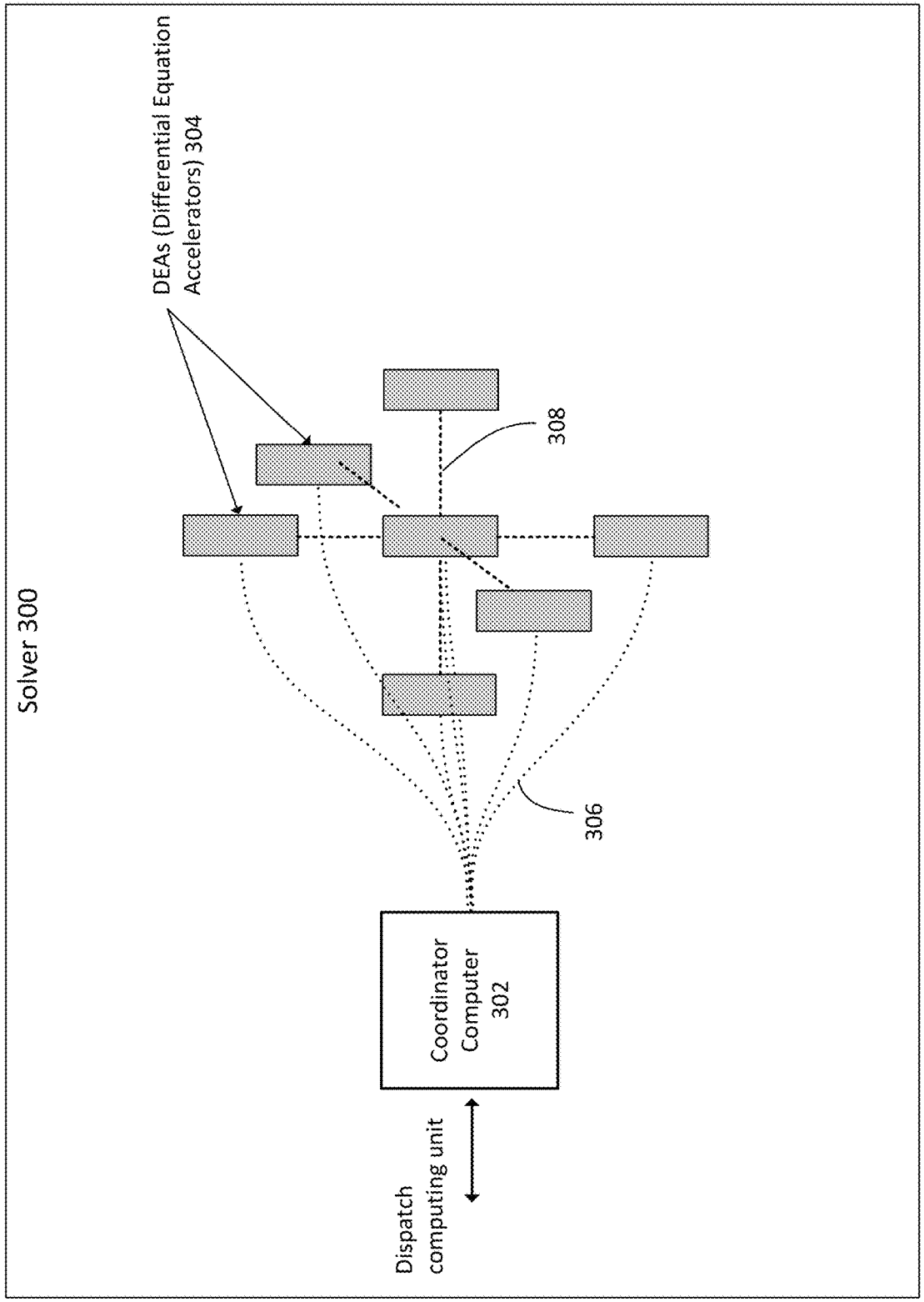
FIG. 3 is a diagram illustrating components of a solver, in accordance with some embodiments.

FIG. 3 is a diagram illustrating components of a solver, in accordance with some embodiments. The solver 300 illustrated in FIG. 3 may correspond to one of the solvers 106 illustrated in FIGS. 1 and 2. The solver 300 comprises a coordinator computer 302, multiple compute units (referred to as Differential Equation Accelerator (DEA) units, or DEAs) 304, one or more DEA-Coordinator interconnects 306, and one or more DEA-DEA interconnects 308.

The coordinator computer 302 (or coordinator 302) is connected to the dispatch computer (e.g., dispatch computer 104) on one side and to multiple DEAs 304 on the other. The coordinator 302 is responsible for coordinating the various aspects of the DEAs when solving a user problem. For example, the coordinator 302 may, in response to receiving a problem package, divide the domain of the problem into a plurality of subdomains, and assigns each subdomain to a respective DEA 304. The coordinator 302 may synchronize the DEAs 304 and initiates solving operations by the DEAs 304. The coordinator 302 further downloads results from each of the DEAs 304.

The solver 300 comprises a plurality of DEAs 304. Each DEA 304 is configured to receive a subdomain of a problem, and generate solution data for the received subdomain. The coordinator computer 302 and the DEAs 304 are connected via DEA-Coordinator interconnects 306 and DEA-DEA interconnects 308, allowing for the coordinator 302 to manage operations of the DEAs 304, and for the DEAs 304 to share stored domain information with each other (discussed in greater detail below).

The DEA-Coordinator interconnects 306 and DEA-DEA interconnects 308 may be implemented as cabling connecting the coordinator 302 to the DEAs 304, and the DEAs 304 to each other, respectively. In some embodiments the interconnects 306 and 308 may be implemented using PCI Express cables (e.g., PCIe v4.0). The number of interconnects between the DEAs 304 may be contingent on how the domain is sliced up across the DEAs in that solver, e.g., based on a partitioning scheme of the solver for partitioning received domains. For example, if the solver is configured to slice the domain up into pyramids, then the number of interconnects may be smaller compared to if it was sliced up into higher order polygons. In some embodiments, if the number of DEAs 304 is large, then it may be hard to physically connect all the DEAs 304 onto one coordinator 302. In such cases, relays (not shown) can be used to bunch up some of the cabling.

Figure 4:
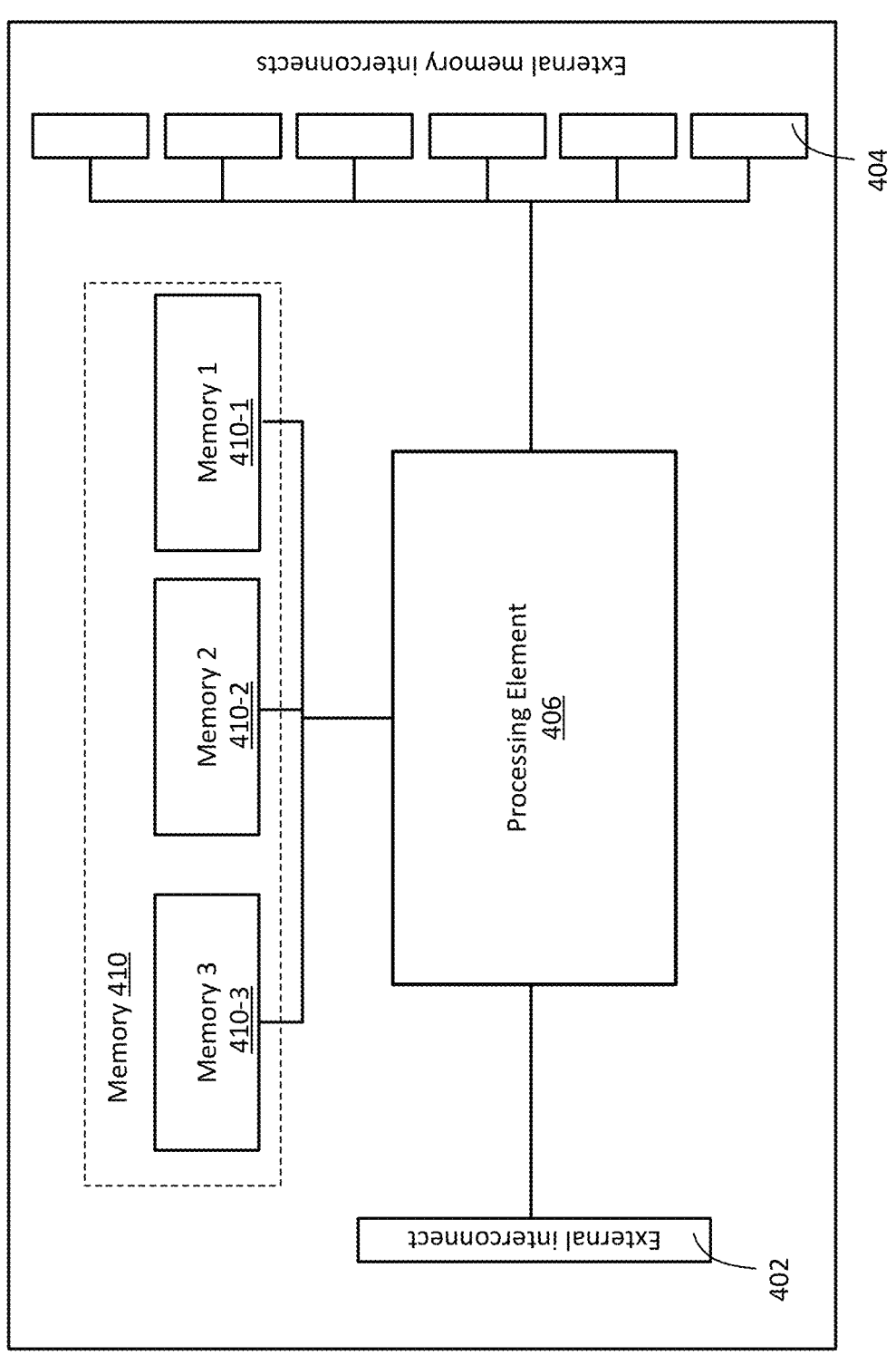
FIG. 4 illustrates a layout of a DEA, in accordance with some embodiments.

FIG. 4 illustrates a layout of a DEA 304, in accordance with some embodiments. The DEA 304 may include an external interconnect 402 that enables transmission of data and control signals going back and forth between the DEA 304 and the coordinator 302. For example, the DEA 304 may receive problem and subdomain data from the coordinator 302 via the external interconnect 402. The DEA 304 may also receive instructions from the coordinator 302 (e.g., synchronization instructions to synchronize with other DEAs of the solver, instructions to begin solving, etc.). In addition, the DEA may transmit generated solution information corresponding to the received problem and subdomain back to the coordinator through the external interconnect 402.

The external memory interconnects 404 comprises interconnect circuitry that manages data and control signals between the various DEA units. For example, in some embodiments, the DEA 304 may require information relating to other subdomains being processed by other DEAs of the solver. As such, the DEA 304 may receive additional subdomain data from other DEAs via the external memory interconnects 404.

The processing element 406 manages the overall functioning of the DEA unit. In some embodiments, the processing element 406 is a processor that processes received subdomain data, determines and stores parameters associated with the problem subdomain, and manages solving of the problem subdomain over a plurality of time-steps.

The memory 410 is used to store the problem to be solved. In some embodiments, the memory 410 of each DEA is divided into three subunits (e.g., first memory unit 410-1, second memory unit 410-2, and third memory unit 410-3). In some embodiments, the memory units 410-1 through 410-3 are implemented as part of the same memory. In other embodiments, the memory units 410-1 through 410-3 are implemented as two or more separate memory chips.

In some embodiments, first and second memory units 410-1 and 410-2 are used in general solving of the partial differential equation, while the third memory unit 410-3 may be used when the DEA 304 is to send data back to the coordinator (e.g., via the external interconnect 402).

Figure 5:
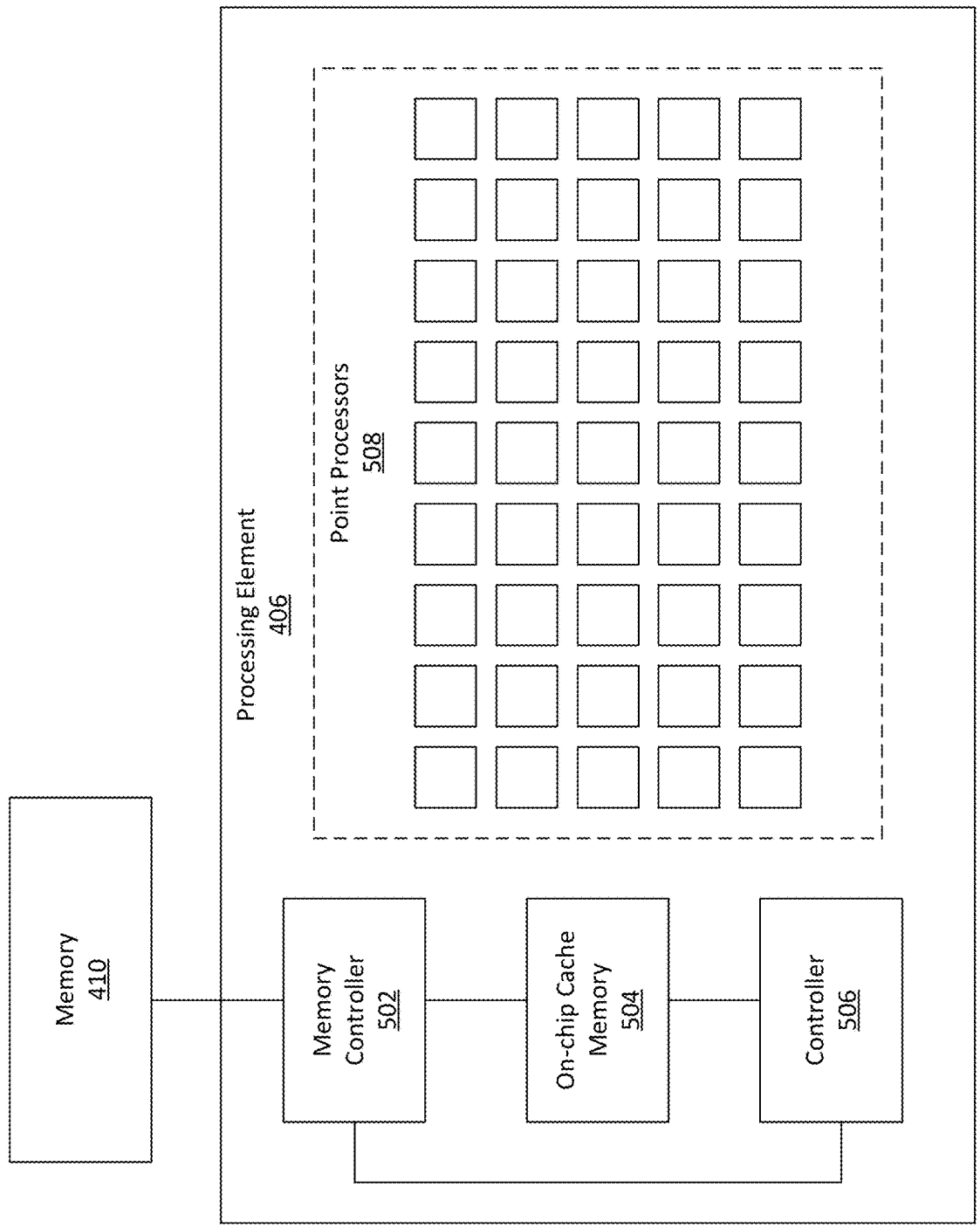
FIG. 5 illustrates a block diagram of the processing element 406 of each DEA, in accordance with some embodiments.

FIG. 5 illustrates a block diagram of the processing element 406 of each DEA, in accordance with some embodiments. The processing element 406 comprises a memory controller 502, on-chip cache memory 504, a controller 506, and point processors 508. The processing element 406 is configured to receive problem data (e.g., from the memory units 410) and to solve the received problem data using the point processors 508.

The controller 506 is a circuit that controls the overall operation of the processing element 406. For example, in some embodiments, the controller 506 receives instructions for configuring the point processors 508, and interfaces with the memory controller 502 to control the flow of data between the memory units 410 and the point processors 508. The memory controller 502 interfaces with the memory units 410 to manage communication of data between the memory units 410 and the point processors.

In some embodiments, the internal memory controller 502 may receive instructions from the controller 506 to retrieve data between the first and second memory units 410-1 and 410-2 and the point processors 508, move processed data to the third memory unit 410-3 in preparation for transmission to the coordinator of the solver, and/or the like. In some embodiments, the memory controller 502 retrieves data corresponding to node data for a first time step from one of the first and second memory units 410-1 and 410-2 to be processed by the point processors 508, which generate node data for a subsequent time step, which is stored to the other of the first and second memory units 410-1 and 410-2. Although FIG. 5 illustrates the memory controller 502 and controller 506 as separate components, in some embodiments, these may be implemented as part of a single controller.

The on-chip cache memory 504 is a circuit configured to store at least a portion of the subdomain data received from memory 410. In addition, the on-chip cache memory 504 may further store local variables used during the solving of partial differential equations. In some embodiments, the on-chip cache memory 504 is implemented as an SRAM. The stored local variables may include any type of variable expected to be highly used during solving of the problem assigned to the DEA that are not expected to change during the solving, such as subdomain data, solve type, and one or more constants to be used during the solving of the subdomain (e.g., fluid density, viscosity, etc.).

The processing element comprises an array of point processors 508 (hereinafter also referred to as a "PP" or "tile" for short). Each PP comprises storage such as a register file, and a computational element such as an arithmetic-logic unit (ALU). While FIG. 5 illustrates a two-dimensional array of point processors 508, in some embodiments, the array of point processors may be implemented as a three-dimensional array of point processors, e.g., a A0×A1×A2 mesh of point processors. In some embodiments, the array of point processors 508 is divided into a plurality of layers/slices, e.g., A2 slices each corresponding to an A0×A1 array of point processors. For ease of discussion, slices of a point processor array are discussed herein primarily as corresponding to two-dimensional arrays of point processors, although it is understood that in other embodiments, a slice may correspond to other arrangements of point processors (e.g., a A0×A1×A2 mesh of point processors being divided into less than A2 slices, where one or more slices correspond to a three-dimensional array of point processors).

Figure 6:
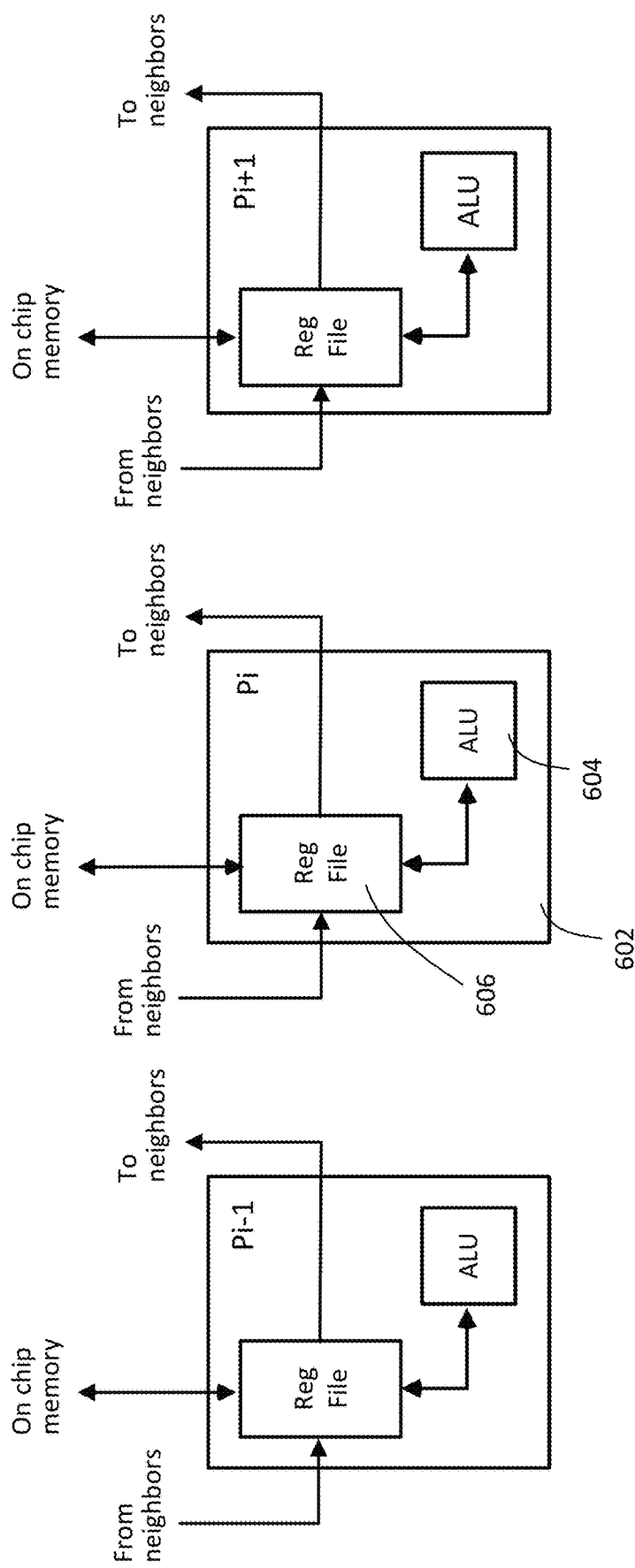
FIG. 6 illustrates a diagram of a point processor of the array of point processors, in accordance with some embodiments.

FIG. 6 illustrates a diagram of a plurality of point processors of the array of point processors, in accordance with some embodiments. Each point processor 602 contains a computational element, such as an ALU 604, and a storage element, such as a register file 606. Each point processor 602 is able to communicate with the on-chip cache memory 504 (e.g., to receive a domain point for processing, global constant values, etc.), as well as a plurality of neighboring point processors of the array. In some embodiments, the register file 606 of a point processor is connected to the neighboring point processors along each dimension of the three-dimensional array of point processors (e.g., 2 neighboring point processors along each dimension, for a total of 6 neighboring point processors). In some embodiments, each point processor being coupled to adjacent point processors of the point processor array allows for the register file 606 of the point processor to receive data from neighboring nodes in the domain to be utilized by the ALU 604 when processing received node data. In cases where the ALU of a particular point processor requires data from nodes that are further away in the domain (e.g., 2 or more point processors away), the node data may be routed through successive point processors of the array to reach the particular point processor, where the routing is pre-scheduled by the compiler. In some embodiments, the data dependencies of a point processor for a particular problem/PDE may be referred to as a "stencil" for the problem/PDE.

During solving, each point processor 602 is configured to receive data for a point of domain (e.g., a node of the domain), and determine a next time-step value for the point of the domain. In some embodiments, each point processor 602 receives input data from the on-chip memory onto its register file 606 (e.g., comprising data for the node at a particular time-step), and performs a plurality of calculations using its ALU 604, where the output of the ALU for any intermediate calculations is written back into the register file 606. The final value (e.g., next time-step value for the received point/node) is output back to on-chip memory. In some embodiments, the memory controller 502 connects the on-chip cache memory 504 to the array of point processors 508 such that the on-chip cache memory 504 can, during a same clock cycle, load input data onto all point processors of a slice of the array, and receive output data from all point processors of a slice of the array. In other embodiments, the on-chip cache memory 504 may be able to load input data onto or receive output data from multiple slices during a cycle, depending on a memory bandwidth of the on-chip memory.

For ease of discussion, the following discussion will be primarily in the context of a problem having a domain that is a structured regular mesh, although it is understood that the design will also work as specified for an unstructured mesh. In such a case, spatial coordinates of the points and the connectivity information of the domain may be encoded with the domain data. Each datapoint of the domain data may have one or more values. For example, when solving the Euler equation, each datapoint is associated with five variable values (e.g., conservation of mass, momentum in each of three dimensions, and energy).

For example, the domain may have:
a spatial domain size of $S_0$, $S_1$, $S_2$, resulting in a total number of points in the 3d domain being $S_0 \times S_1 \times S_2$
each datapoint having k values
the number of computations per value per timestep update (computational intensity) is $C_i$
the total number of timesteps is t, and
stencil dimensions $n_0$, $n_1$, $n_2$.

Accordingly, the computational requirements are $S_0 \times S_1 \times S_2 \times k \times C_i$ total operations (which may be floating point, fixed point or custom type operations). For example, a real-world problem package may have parameters $S_0 = S_1 = S_2 = 1000$, $k=6$, $C_i=1000$, $t=106$. To solve this problem it would take roughly 1 Exo floating point operations ($10^{18}$). It is useful to view the computational requirements as a 5-dimensional "computational space" ($S_0$, $S_1$, $S_2$, k, $C_i$) corresponding to 3 spatial dimensions and 2 computational dimensions.

In some embodiments, the goal for scheduling the streaming of off-chip data (e.g., from the memory 410) onto the local on-chip memory is to find a schedule for streaming all ($S_0 * S_1 * S_2 * k$) pieces of data on to the chip assuming a Memory Bandwidth of B/cycle (where B<<each of $S_0$, $S_1$, $S_2$). In some embodiments, the design is configured such that there is no re-streaming of the same data, and on-chip caching is minimized by using any cached data as soon as possible. In some embodiments, each chunk B of data has domain locality, and has domain locality to previous and following chunks. In some embodiments, this can be accomplished by tiling the data into the 8-dimensional ($S_0\_o$, $S_1\_o$, $S_2\_o$, $k\_o$, $S_0\_i$, $S_1\_i$, $S_2\_i$, i), where $S_0\_i * S_1\_i * S_2\_i * k\_i = B$ (which may correspond to the dimensions of the point processor array A0×A1), $S_n\_o * S_n\_i = S_n$ for each n in [0, 1, 2], and $k\_o * k\_i = k$, where i and o indices stand for inner and outer respectively in relation to blocking of the domain dimensions (e.g., inner and outer loops for partitioning the domain). For example, in some embodiments, the data of the domain is tiled such that each point processor receives node data corresponding to a portion of the values of a domain datapoint at a time (e.g., k_i values out of a total k values for the datapoint).

In some embodiments, because of data dependencies across chunks with domain localities, caching may be used to store this data locally on chip without having to go back to main memory (e.g., on chip cache memory 504 illustrated in FIG. 5). In some embodiments, the cached data may correspond to data those at the boundaries of the ($S_0\_i$, $S_1\_i$, $S_2\_i$, i) block, based off the size of the stencil ($n_0$, $n_1$, $n_2$), and includes:

S2 Boundary: A block of size roughly ($S_0\_i*S_1\_i*n_2*k\_i$) is cached every cycle to be used k_o cycles later S1 Boundary: A block of size ~($S_0\_i*n_1*S_2\_i*k\_i$) is cached every cycle to be used $S_2\_o*k\_o$ cycles later S0 Boundary: A block of size ~($n_0*S_1\_i*S_2\_i*k\_i$) is cached every cycle to be used $S_1\_o*S_2\_o*k\_o$ cycles later.

Due to caching, every cycle the point processor array receives an input block of size ($S_0\_i+n_0$, $S_1\_i+n_1$, $S_2\_i+n_2$, k_i), and will compute an output block of size ($S_0\_i$, $S_1\_i$, $S_2\_i$, i) (assuming an Initiation Interval of 1, but with some latency). The decision about how to schedule the $S_0\_i*S_1\_i*S_2\_i$ data on the 3+dimensional architecture affects the structure of the architecture.

In some embodiments, on-chip scheduling for the array of point processors can be considered the following way. In some embodiments, a point processor array with three dimensions of A0, A1, A2 allows scheduling the computational blocks in 3 dimensions+time (A0, A1, A2, t), causing the computed output block to be ($S_0\_inner$, $S_1\_inner$, $S_2\_inner$) and the computational space to be ($S_0\_inner$, $S_1\_inner$, $S_2\_inner$, $C_i$). In some embodiments, the assignment is ($S_0\_i$, $S_1\_i$, $S_2\_i$, $C_i$)->(A0, A1, A2, t) is used, where the computation dimension is time. In some embodiments, the processing element 406 loads domain data onto a different slice of the point processor array each cycle. For example, in every cycle, to maintain lockstep operation, ($S_0\_i$, $S_1\_i$, $S_2\_i$) input values are loaded onto the (A0, A1, prev+1) slice of the array. In some embodiments, $S_0\_i<=A0$ and $S_1\_i<=A1$, in order to accommodate additional surrounding datapoints needed to calculate next values of the input data, based on the stencil size $n_0 \times n_2$.

In some embodiments, connections between the on-chip memory and the slices of the point processor array are multiplexed, such that the on-chip memory is able to load and/or receive data from all tiles of a subset of slices of the point processor array each cycle (e.g., all tiles of a particular A0×A1 slice). In some embodiments, data (e.g., node data) for a single (A0, A1, a) slice of the array is loaded every cycle from the on-chip caching memory, so that inputs can be broadcast to tiles in the A2 dimension in a staggered or multiplexed manner. Similarly, the computed outputs of a (A0, A1, b) slice of the array can be output every cycle to the on-chip caching memory. The computed outputs can occur at any tile in the A2 dimension and therefore the tiles may be similarly staggered/multiplexed. In some embodiments, the on-chip memory is configured to load data to and receive output data from the same slice of point processors during a particular clock cycle (e.g., a=b). In other embodiments, during a particular clock cycle, node data may be loaded onto and received from different slices of point processors (e.g., a≠b).

In some embodiments, the point processors receive instructions from the on-chip memory. In some embodiments, the point processors may receive instructions corresponding to operations (e.g., ALU operations) to be performed over multiple clock cycles. In other embodiments, the point processors, in order to determine a node value for a next time-step, receive instructions over multiple clock cycles, where each instruction is performed during the current clock cycle when it is received, or a later clock cycle, based upon a predetermined timing offset between when an instruction is received and when it is executed. In some embodiments, instructions provided to the point processors over multiple clock cycles may be referred to as an instruction stream.

In embodiments where domain data is provided to slices of the array in a staggered fashion, the instructions may be pipelined between tiles of the point processor array along the A2 dimension (e.g., based on a timing at which the domain data is provided to each slice). For example, since the (x, y, i) tile on cycle 't' tile is executing the same instruction that the (x, y, i+1) tile is executing on cycle 't+1', the instruction stream (including constants) can therefore be pipelined across the A2 dimension. In some embodiments, the A2 dimension may form a ring (last processor along the A2 dimension is followed by first processor) for pipelining instructions.

Figure 7:
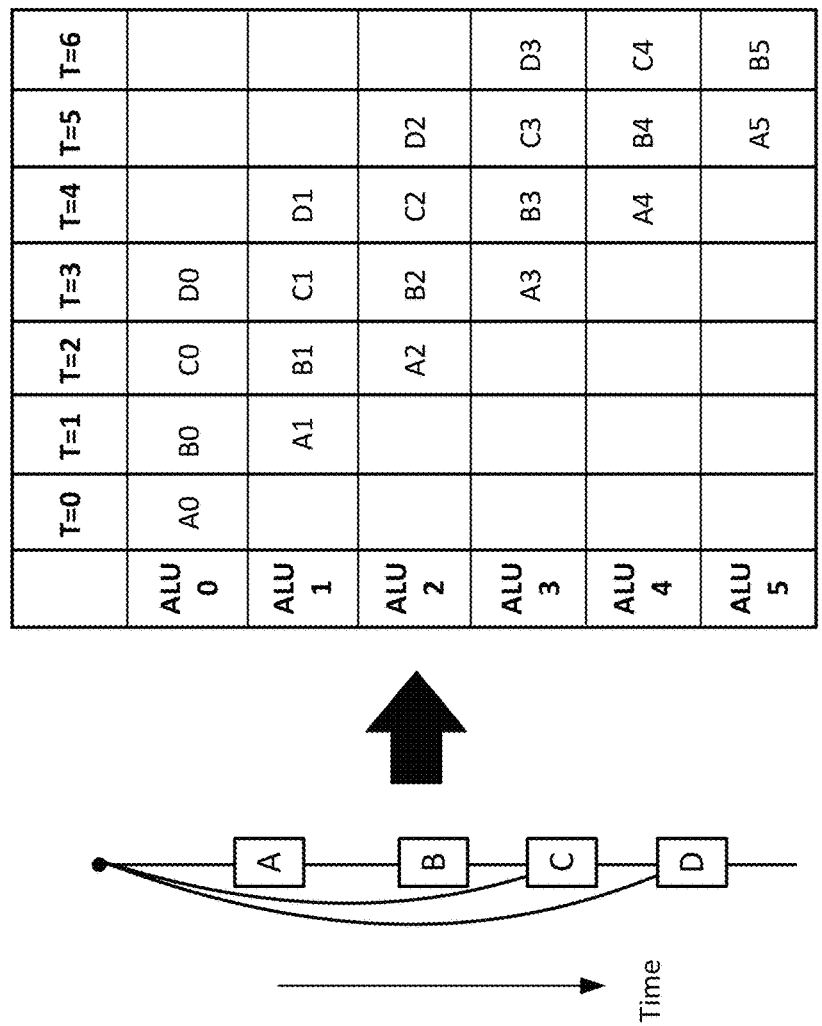
FIG. 7 illustrates a diagram showing a plurality of point processors in the A1 dimension of the array of point processors, in accordance with some embodiments.

FIG. 7 illustrates a diagram showing an example of operations of a point processor array, in accordance with some embodiments. FIG. 7 illustrates a point processor array having a plurality of tiles arranged in a plurality of slices (e.g., ALUs 0, 1, 2, 3, etc., where each of the ALUs corresponds to a point processor tile of a respective slice of the array). During solving, to generate a next time-step value of a point of a domain, each point processor performs a series of computations (e.g., computations A, B, C, and D) on received point data over time.

As illustrated in FIG. 7, during solving, the point processors of each slice receive data for nodes (e.g., nodes 0, 1, 2, 3, etc.) to be processed in a staggered fashion over consecutive cycles (e.g., T=0, 1, 2, 3, etc.). For example, at time T=0, the tile/ALU 0 receives data for node 0, and performs computation A on the data of node 0 (e.g., based upon a received instruction of the instruction stream), and stores the resulting data back to its respective register file. At time T=1, the tile/ALU 1 receives data for node 1, and performs computation A on the data of node 1, while tile/ALU 0 performs computation B on the data for node 0. At each subsequent time cycle, each tile/ALU performs a next computation on data for its respective node (e.g., node 0 for ALU 0, node 1 for ALU 1, etc.), and the on-chip memory provides new node data to the tiles/ALUs of a subsequent slice of the array. In some embodiments, such as that illustrated in FIG. 7, the total number of slices is greater or equal than a number of computation cycles needed to generate a next time-step value for a given node, allowing for the processing element to provide new node to a next slice each cycle. In other embodiments, the total number of slices is less than a number of computation cycles needed to generate a next time-step value for a given node, in which case the processing element may delay providing new node data from on-chip memory to tiles/ALUs of subsequent slices of the array to allow for the tiles/ALUs of the slice to finish performing computations on previously-received node data before receiving new node data.

In this manner, node data for the domain is processed by respective point processor tiles, to generate a next value for the node (e.g., for a next timestep). Each point processor is configured to perform all computations for a respective node before receiving data for a new node. For example, as illustrated in FIG. 7, ALU0 performs computations A, B, C, and D for node 0 over successive time periods, ALU1 performs computations A, B, C, and D for node 1, ALU2 performs computations A, B, C, and D for node 2, etc.

In some embodiments, each point processor tile receives instructions to perform different computations during different clock cycles. In some embodiments, the instructions are stored in on-chip memory 504 (e.g., a portion of the on-chip memory corresponding to a dedicated instruction memory), and provided to at least a portion of the point processor tiles by the controller 506. For example, ALU0 may receive an instruction to perform computation A during time T=0, an instruction to perform computation B during time T=1, etc. In some embodiments where the processing element is configured to provide node data to the slices of the point processor array in a staggered manner (e.g., as illustrated in FIG. 7), the instructions may be pipelined between tiles of different slices of the point processor array (e.g., from ALU0 to ALU1, and so forth). This may reduce an amount of connections between the point processors and the on-chip memory for providing instructions to the point processors. For example, the on-chip memory may be configured to provide instructions only to a first slice of the point processor array (e.g., the slice containing ALU0), whereupon the point processors of the first slice pipeline the instruction to corresponding point processors of a next slice (e.g., a second slice containing ALU1), and so on. In some embodiments, as discussed above, the point processor slices may form a ring where PPs of a last slice of the array pipeline instructions back to the first slice of array (e.g., in cases where the number of time cycles needed to produce a next time-step node value is a factor of a number of slices of the array), allowing for the PPs to continue to process additional nodes using the same set of instructions, without additional instructions being transmitted from on-chip memory.

In some embodiments, a computation for a node may depend on a result of a previous computation, the original node data, and/or node data of one or more nearby nodes (e.g., based on stencil size). For example, as shown in the left side of FIG. 7, computation C for a node is based on results of computation B for the node, as well as the original data of the node. In some embodiments, the register file of each point processor tile is configured to be able to store any intermediate values needed by the ALU of the tile for subsequent computations, such as the original node data, node data from nearby nodes (e.g., as shown in FIG. 6), etc. For example, each tile may further receive data from other point processors of the computational array (not shown in FIG. 7) for performing its computations (e.g., original node data received by another point processor(s), and/or intermediate results calculated at the other point processor(s)).

As such, each point in a domain of the problem package is solved at one tile of the point processor array. The data for solving is maintained and stored in the register file of the tile responsive for processing the point. In addition, each point processor is able to access data from neighboring point processors (e.g., six neighbors, two along each dimension).

The processing element provides a data stream that loads data for nodes of the domain onto 2D slices of the point processor array in a staggered fashion (e.g., one slice per time period). In addition, end result values calculated by the point processors of the array are stored back to on-chip memory in a similar staggered fashion (e.g., one slice per time period). In some embodiments, where only one layer/slice of the point processor array accesses the on-chip memory at a time, an amount of memory bandwidth needed by the on-chip memory may be reduced. As such, the memory bandwidth of the on-chip memory of the processing element may be configured to be able to load data to all tiles of a single slice, and/or receive data from all tiles of a single slice, at a time.

Scheduling and Point Processor Configuration

Instruction scheduling for the processing element may be performed at the compiler, based upon the problem package to be solved. For a given problem package, each tile of the point processor array may receive the same instruction stream, offset by one per layer/slice. In some embodiments, tiles of a first layer/slice of the point processor array receive the instruction stream, and pipeline the instruction stream across the layers of the point processor array. The instructions of the instruction stream may specify ALU operations of the point processor, the source of ALU inputs needed to perform the ALU operations (e.g., data from neighboring point processors), and source/destination of neighboring connection to/from the register file of the point processor.

The goal of the compiler is to, given a particular partial differential equation (or similar problem) that will be applied to all points on a 1, 2 or 3 dimensional grid, determine how to configure the computational array to compute the equation. For ease of discussion, operations of the compiler are discussed in relation to the non-linear convection equation below:

$$\frac{\delta u}{\delta t} + u\frac{\delta u}{\delta x} = 0 \quad (2)$$

In some embodiments, the compiler translates the partial differential equation into an intermediate equation, e.g., a discretized form of the partial differential equation. For example, the partial differential equation of Equation (2) above can be translated into the discretized form shown below in Equation (3), which defines how a node value for a next time step $u_i^{n+1}$ is determined based on the value of node $u_i^n$ of a current time step, and any nearby nodes, e.g., stencil inputs, of the domain (e.g., $u_{i-1}^n$):

$$u_i^{n+1} = u_i^n - u_i^n \frac{\Delta t}{\Delta x}(u_i^n - u_{i-1}^n) \quad (3)$$

Figure 8:
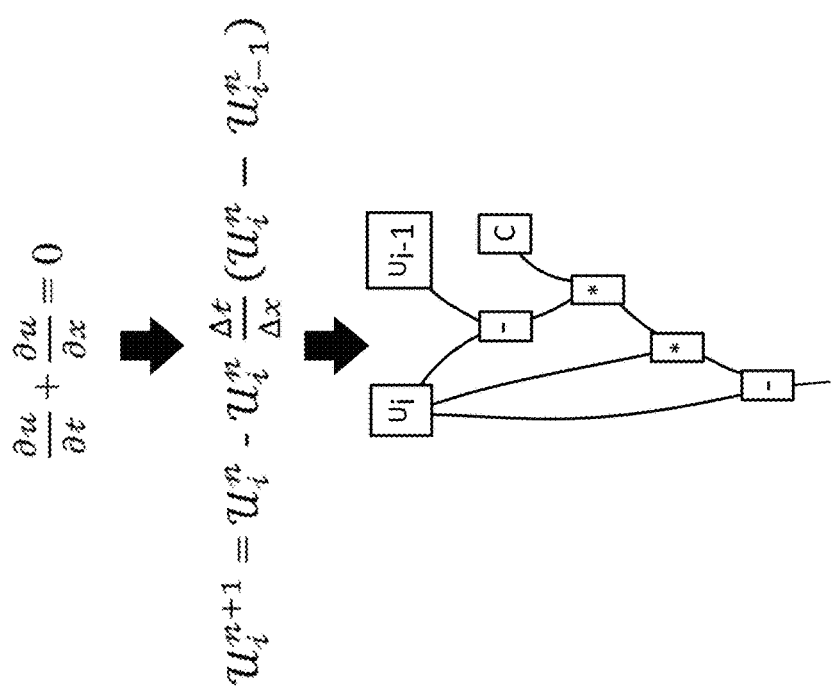
FIG. 8 illustrates an example of a graphical representation of a discretized equation, in accordance with some embodiments.

FIG. 8 illustrates an example of a graphical representation of a discretized equation, in accordance with some embodiments. The discretized equation indicates the stencil inputs for a node with some 3d offset, constant values, and basic operations. The graphical representation of FIG. 8 outputs the next finite difference time step, where standard optimizations can be performed to minimize the number of instructions. As shown in FIG. 8, the basic operations of the discretized equation may be expressed as arithmetic operations (e.g., addition/subtraction and multiplication), and the parameter $$\frac{\Delta t}{\Delta x}$$

may be expressed as a constant C.

Figure 9:
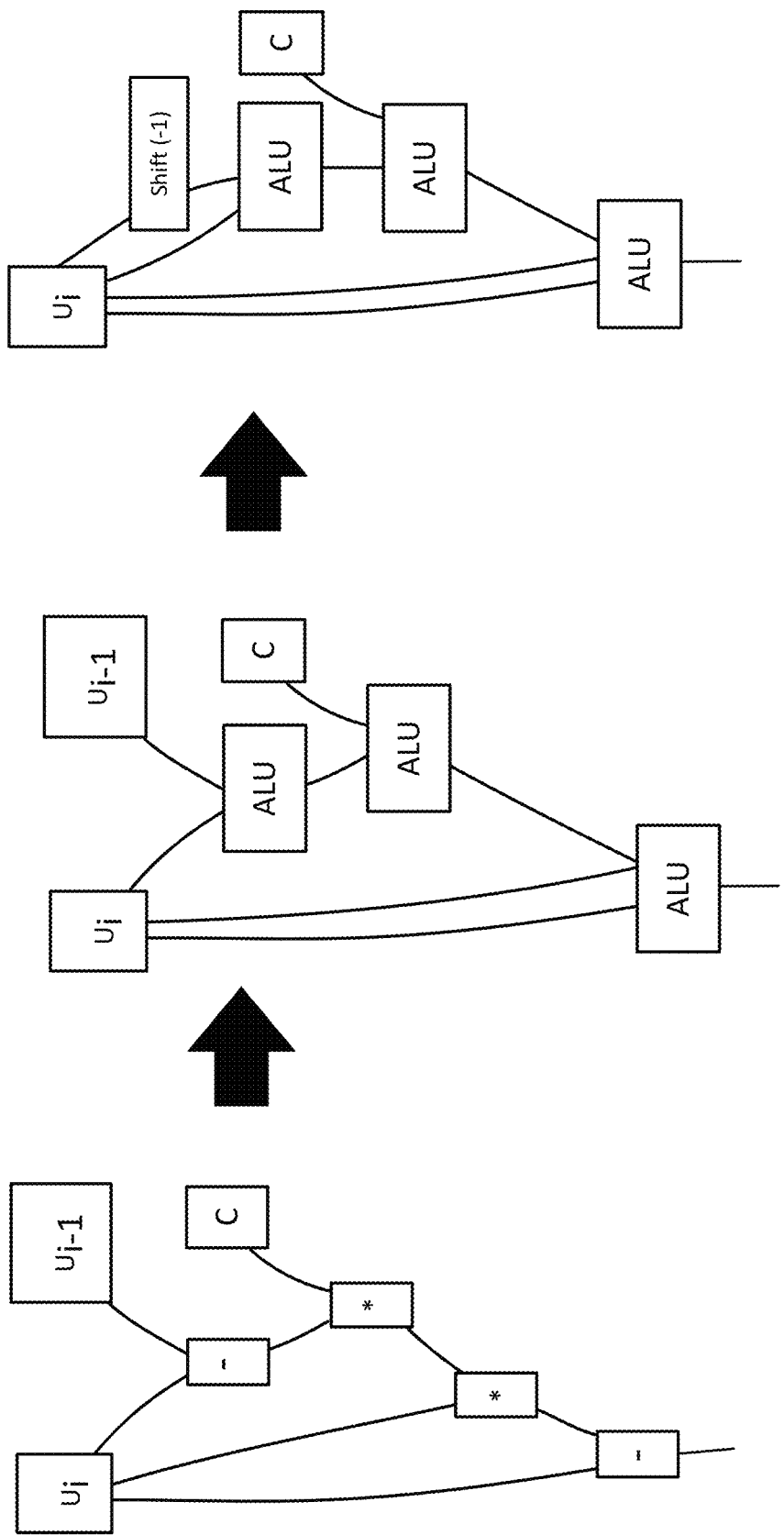
FIG. 9 is a diagram showing how the compiler maps the graphical representation of FIG. 8 to instructions, in accordance with some embodiments.

FIG. 9 is a diagram showing how the compiler maps the graphical representation of FIG. 8 to instructions, in accordance with some embodiments. The compiler translates the discretized equation into ALU operations with the goal to minimize the number of ALU operations. For example, in some embodiments, multiple arithmetic operations (e.g., a multiply and subtract) may be fused and performed at a single ALU operation. In some embodiments, adjacent operations involving a common term (e.g., as shown in FIG. 9, a multiplication of a current value by $u_i$, followed by a subtraction by the same term $u_i$) are combined into a single ALU operation, reducing an amount of data needed to be routed to the tiles of the point processors. In addition, data offsets (e.g., data dependency on other nodes of the domain) are replaced with a shift node parametrized by a 3d offset. In some embodiments, shift nodes are interpreted as a connection to and from the associated neighboring tile's value.

Figure 10:
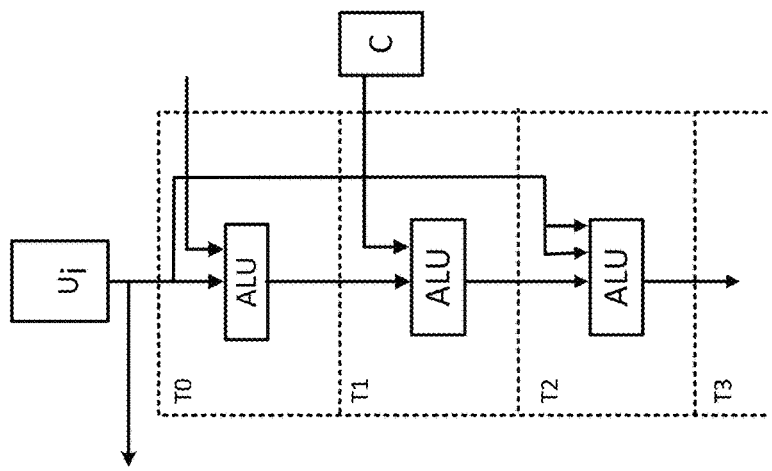
FIG. 10 is a diagram showing how the compiler maps the instructions shown in FIG. 9 to a point processor, in accordance with some embodiments.
Figure 10:
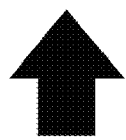
Figure 10:
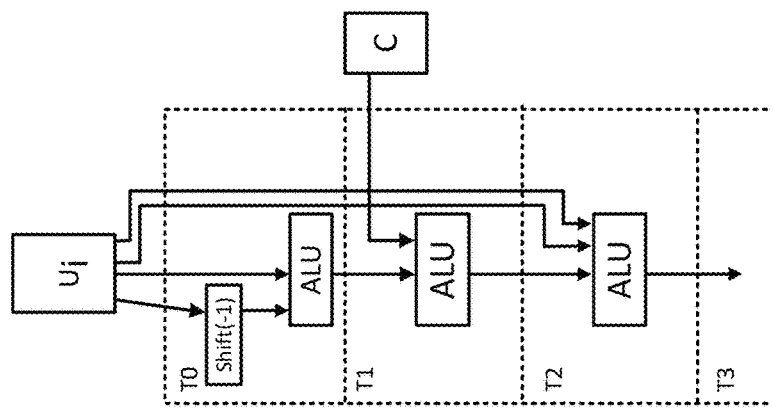
Figure 10:
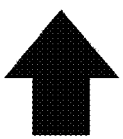
Figure 10:
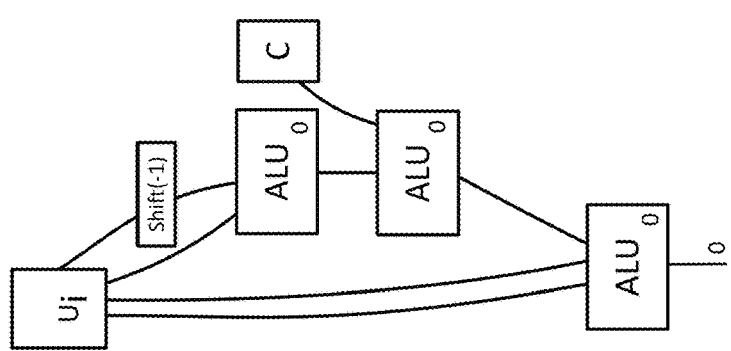

In some embodiments, the compiler determines processor assignment, in which each domain node is assigned a process ID where the process ID is specified as a 3D offset. In some embodiments, the nodes are assigned a processor offset to minimize the total amount of shifts (e.g., by assigning process IDs such that neighboring nodes of the domain are mapped to architecturally neighboring point processors of the point processor array). Second, the compiler determines an order of ALU operations to be executed by the point processor for each node. FIG. 10 is a diagram showing how the compiler maps the instructions shown in FIG. 9 to a point processor, in accordance with some embodiments. For example, as shown in FIG. 10, the ALU operations corresponding to the discretized form of the equation are assigned to times T0, T1, T2. In addition, the compiler performs routing between point processors of the computational array, in accordance with some embodiments. In some embodiments, the compiler assigns a routing ID to all of the inputs/outputs and neighbor connections to each ALU. For example, the discretized form shown in Equation (3) above indicates that the next time step value of a node is based on a value of a nearby node. As shown in FIG. 10, the compiler converts each shift into a first routing to receive a value from a tile of a first neighboring point processor during a given cycle, and a second routing to provide a value to a tile of a second neighboring point processor during a given cycle. In embodiments where data and instructions are provided to slices of the computational array in a staggered manner, the compiler may schedule the routings in a manner that accounts for the temporal offset between slices, such that an instruction for a point processor tile of a first slice that requires a value from a point processor tile of a second slice is scheduled such that the necessary value will be available when the instruction is executed. The compiler further assembles the tile information for each tile into an instruction stream (i.e., ALU operations and routing IDs) for a point processor, and creates the global constants $$\left(\text{e.g., } C = \frac{\Delta t}{\Delta x}\right).$$

In some embodiments, global constant values may be stored in a configurable register file shared by some or all of the point processors, from which each point processor may read from. In some embodiments, the global constants may be provided to the point processor tiles as part of the instruction stream (e.g., embedded as part of the instruction in which they are used), or may be provided to the point processor tiles with the node data received from on-chip memory.

Because all the data and computational requirements are known at compile time, and thus, there need not be any dynamic scheduling during runtime on the architecture (which, in GPUs and CPUs, may require a sizable percentage of chip area in the form of circuitry for coordinating dynamic program behavior). Because the point processors 508 do not need to perform any dynamic scheduling, each problem can be statically scheduled on the architecture at compile time, allowing for a greater proportion of on-chip area to be allocated towards useful computation, turning memory bandwidth bound problems into memory compute bound ones.

Figure 11:
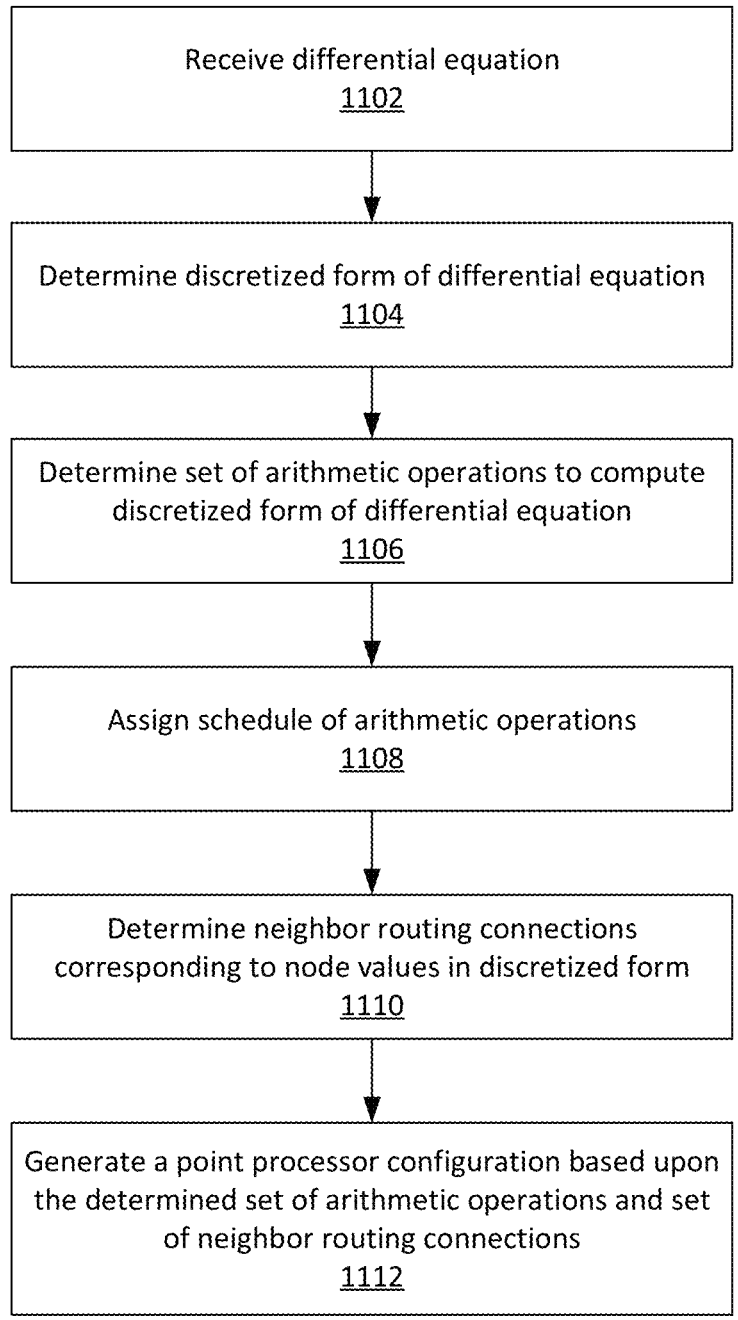
FIG. 11 is a flowchart of a process for generating a point processor configuration for solving a partial differential equation problem package, in accordance with some embodiments.

FIG. 11 is a flowchart of a process for generating a point processor configuration for solving a partial differential equation problem package, in accordance with some embodiments. In some embodiments, the operations of the process are performed by a compiler. The compiler receives 1102 a partial differential equation, and determines 1104 a discretized form of the partial differential equation.

The compiler determines 1106 a set of arithmetic operations to be performed by the ALU of a point processor to compute the discretized form of the partial differential equation. In some embodiments, the compiler maps the arithmetic operations to ALU operations that can be performed within a single cycle, in which at least two of the arithmetic operations are fused to be performed by the ALU in one cycle.

The compiler determines 1108 a schedule of the arithmetic operations to be performed by the ALU of each point processor to compute the next value of a point of the domain. For example, the compiler maps each arithmetic operation to a respective time cycle to specify an order of operations to be performed by the point processor to determine the next value of a domain point over a plurality of time cycles.

The compiler determines 1110 neighbor routing connections corresponding to node values in the discretized form of the partial differential equation. In some embodiments, the compiler converts each stencil input corresponding to nearby nodes indicated in the discretized equation into shift nodes, and generates, for each shift node, neighbor routing information specifying a first connection for the point processor tile to receive a value from an adjacent point processor, and a second connection for the point processor tile to provide a value to another adjacent point processor.

The compiler generates 1112 an instruction stream configuration based upon the determined set of arithmetic operations and set of neighbor routing connections. The instruction stream configuration may correspond to instructions indicating ALU operations and routing IDs for the tiles of the point processors to be pipelined between slices of the point processor array during solving.

Figure 12:
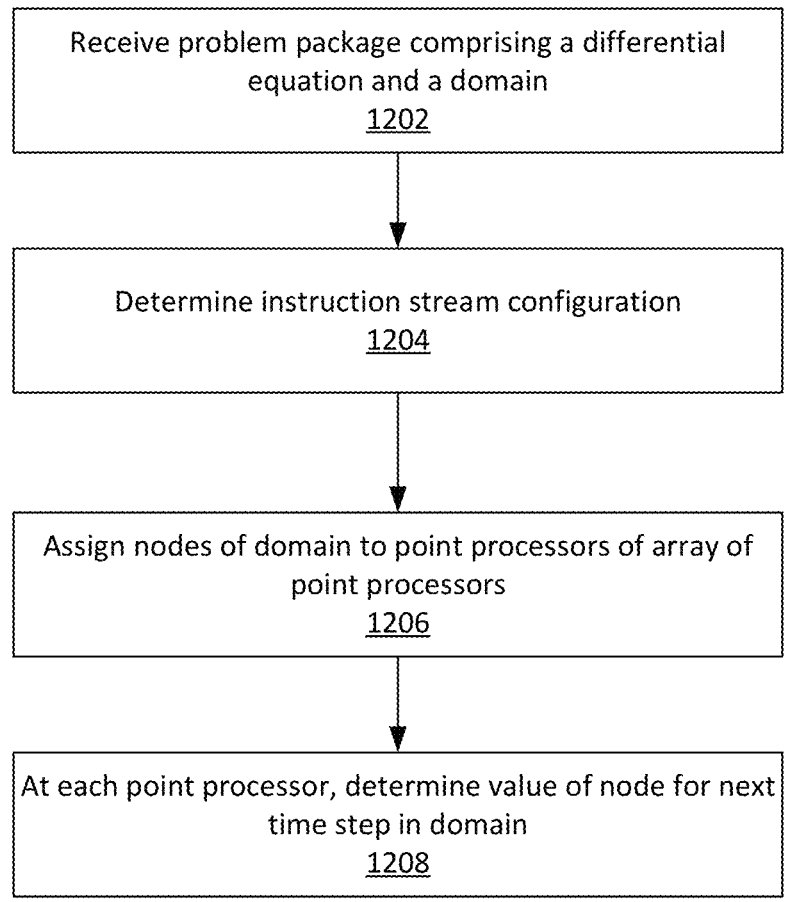
FIG. 12 is a flowchart of a process for solving a partial differential equation using an array of point processors, in accordance with some embodiments.

FIG. 12 is a flowchart of a process for solving a partial differential equation using an array of point processors, in accordance with some embodiments. In some embodiments, the operations of the process are performed by a processing element of a DEA (e.g., the processing element 406). The processing element receives 1202 information associated with a problem package, the problem package comprising a partial differential equation and a domain.

The processing element determines 1204 an instruction stream configuration associated with the problem package. The instruction stream configuration specifies a sequence of instructions to be pipelined to point processors of the point processor array over a plurality of time cycles, based on the type of partial differential equation associated with the problem package. Each instruction may specify an ALU operation to be performed by the point processor, and, optionally, data to be exchanged between the point processor and at least one neighboring point processor.

The processing element assigns 1206 nodes of the domain of the problem package to the array of point processors. For example, where the processing element includes an A0×A1× A2 array of point processors divided into A2 slices of A0×A1 point processors, the domain of the problem package may be divided into sections/slices of A0×A1 nodes to be provided to different slices of array of point processors in a staggered fashion.

The processing element determines 1208, at each point processor, a value of node for next time step in domain. In some embodiments, the processing element provides the instruction stream to point processors of the point processor array over a plurality of time cycles in accordance with an assigned schedule, the instruction stream instructing each point processor which ALU operations to perform on which data. In some embodiments, the instruction stream is pipelined between the slices of the point processor array, such that point processors of different slices receive instructions of the instruction stream in a staggered fashion. Each point processor processors node data corresponding to its assigned node of the domain in accordance with the instruction stream, and outputs a computed result value (e.g., to the on-chip memory of the processing element). Steps 1206 and 1208 may be repeated until node data for a desired number of time steps has been computed.

In some embodiments, the above-described architecture is able to utilize the full off-chip memory bandwidth every clock cycle to load new data and store fully-computed data. Data from each point of the domain is only loaded once from off-chip, and partial results of a computation should remain on chip. Because scheduling is performed at the compiler, there is no need for dynamic scheduling, allowing for most of the chip area to be used "compute" so that only programs where (computational intensity*memory bandwidth>chip's compute capacity) will be compute-bound. The chip's compute will be comprised of a large set of simple parallel computational units (point processors). Architecturally neighboring point processors are assigned to perform neighboring computations in the domain to facilitate stencil-based and computational data dependencies, and to reduce on-chip data movement to minimize power consumption.

In some embodiments, each point processor tile performs a limited number of potential operations across all different forms of PDEs that are use cases, e.g., either a logic operation, a calculation, or a passthrough. These operations can easily be performed on a simple arithmetic logic unit (ALU) whilst values from adjacent cells required for the computation can be transmitted or received via routings between the register files of different point processors. As such, each point processor of the array of point processors comprise a register file and an ALU, and is configurable to exchange data with nearby point processors. Each point processor performs the same set of operations during solving of the problem package, allowing for the compiler to generate an instruction for one point processor that can be applied to all point processors of the array.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A system, comprising:
a memory configured to store a plurality of nodes of a domain corresponding to a first time-step, the nodes associated with a partial differential equation having a discretized form;
an array of configurable point processors, each point processor comprising:
an arithmetic logic unit (ALU) configurable to perform one or more arithmetic operations on a node value received by the point processor; and
a register file configurable to store node value data received by the point processor, and to communicate with at least one neighboring point processor of the array;
a controller configured to process the plurality of nodes of the domain using the array of point processors by providing a respective node of the plurality of nodes to each point processor of the array of point processors, and an instruction stream for configuring a point processor of the array of point processors to at least a portion of the array of point processors;
wherein each point processor of the array of point processors processes its respective node to generate node data for a next time step of the domain by applying a plurality of instructions of the instruction stream to data of its respective node.

2. The system of claim 1, wherein the instruction stream comprises:
a set of instructions corresponding to arithmetic operations for computing the discretized form of the partial differential equation over a plurality of time periods;
a set of neighbor routings for the point processor generated based upon node values within the discretized form of the partial differential equation, each neighbor routing of the set of neighbor routings indicating data from at least one neighboring point processor of the array of point processors for performing at least one arithmetic operation of the set of instructions during the plurality of time periods.

3. The system of claim 2, wherein each neighbor routing of the set of neighbor routings specifies a first connection for the point processor tile to receive a value from an adjacent point processor, and a second connection for the point processor tile to provide a value to another adjacent point processor.

4. The system of claim 2, wherein the instruction stream further comprises one or more constant values to be used in performing at least one arithmetic operation of the set of instructions.

5. The system of claim 2, wherein the controller is configured to provide the instruction stream to at least a portion of the array of point processors over the plurality of time periods.

6. The system of claim 2, wherein each point processor of the array of point processors is configured to execute an instruction of the set of instructions to process its respective node each clock cycle over a plurality of clock cycles.

7. The system of claim 1, wherein:
the array of point processors comprises a three-dimensional array of point processors divided into a plurality of slices; and
wherein the controller is configured to provide node data of the domain to the slices of the array of point processors in a staggered fashion, in which node data is provided to all point processors of a given slice during a same clock cycle, and to point processors of a subsequent slice during a subsequent clock cycle.

8. The system of claim 7, wherein each slice of the plurality of slices corresponds to a two-dimensional array of point processors.

9. The system of claim 7, wherein the controller is configured to provide a set of instructions of the instruction stream to a first slice of the plurality of slices, and wherein the first slice is configured to pipeline the instructions of the set of instructions to a second slice of the array of point processors.

10. The system of claim 9, wherein a timing of which first slice is configured to pipeline the instructions to the second slice of the array of point processors is based upon a clock cycle during which the controller is configured to provide node data to the point processors of the second slice.

11. A method, comprising:
storing, in a memory, a plurality of nodes of a domain corresponding to a first time-step, the nodes associated with a partial differential equation having a discretized form;
transmitting an instruction stream for configuring a point processor of an array of configurable point processors to at least a portion of the array of point processors, wherein each point processor comprises:
an arithmetic logic unit (ALU) configurable to perform one or more arithmetic operations on a node value received by the point processor; and
a register file configurable to store node value data received by the point processor, and to communicate with at least one neighboring point processor of the array;
processing the plurality of nodes of the domain using the array of point processors by providing a respective node of the plurality of nodes to each point processor of the array of point processors, wherein each point processor of the array of point processors processes its respective node to generate node data for a next time step of the domain by applying a plurality of instructions of the instruction stream to data of its respective node.

12. The method of claim 11, wherein the instruction stream comprises:
a set of instructions corresponding to arithmetic operations for computing the discretized form of the partial differential equation over a plurality of time periods;
a set of neighbor routings for the point processor generated based upon node values within the discretized form of the partial differential equation, each neighbor routing of the set of neighbor routings indicating data from at least one neighboring point processor of the array of point processors for performing at least one arithmetic operation of the set of instructions during the plurality of time periods.

13. The method of claim 12, wherein each neighbor routing of the set of neighbor routings specifies a first connection for the point processor tile to receive a value from an adjacent point processor, and a second connection for the point processor tile to provide a value to another adjacent point processor.

14. The method of claim 12, wherein the instruction stream further comprises one or more constant values to be used in performing at least one arithmetic operation of the set of instructions.

15. The method of claim 12, wherein transmitting the instruction stream comprises providing the instruction stream to the at least a portion of the array of point processors over the plurality of time periods.

16. The method of claim 12, wherein each point processor of the array of point processors is configured to execute an instruction of the set of instructions to process its respective node each clock cycle over a plurality of clock cycles.

17. The method of claim 12, wherein:
the array of point processors comprises a three-dimensional array of point processors divided into a plurality of slices; and
wherein providing a respective node of the plurality of nodes to each point processor of the array of point processors comprises providing node data of the domain to the slices of the array of point processors in a staggered fashion, in which node data is provided to all point processors of a given slice during a same clock cycle, and to point processors of a subsequent slice during a subsequent clock cycle.

18. The method of claim 17, wherein each slice of the plurality of slices corresponds to a two-dimensional array of point processors.

19. The method of claim 17, wherein transmitting the instruction stream comprises providing a set of instructions of the instruction stream to a first slice of the plurality of slices, and wherein the first slice is configured to pipeline the instructions of the set of instructions to a second slice of the array of point processors.

20. The method of claim 19, wherein a timing of which first slice is configured to pipeline the instructions to the second slice of the array of point processors is based upon a clock cycle during which the controller is configured to provide node data to the point processors of the second slice.

* * * * *